United States Patent
Stark et al.

(10) Patent No.: US 6,863,806 B2
(45) Date of Patent: Mar. 8, 2005

(54) BARGE-MOUNTED TIDAL-POWERED DESALINIZATION SYSTEM

(75) Inventors: Christian Stark, Edmonds, WA (US); Brett Holton, Edmonds, WA (US)

(73) Assignee: Lunatech, LLC, Las Vegas, NV (US)

(*) Notice: Subject to any disclaimer, the term of this patent is extended or adjusted under 35 U.S.C. 154(b) by 142 days.

(21) Appl. No.: 10/407,487

(22) Filed: Apr. 4, 2003

(65) Prior Publication Data

US 2003/0189000 A1 Oct. 9, 2003

Related U.S. Application Data

(60) Provisional application No. 60/370,085, filed on Apr. 4, 2002.

(51) Int. Cl.[7] .............................................. E02B 9/08
(52) U.S. Cl. .................. 210/170; 210/121; 210/122; 290/42; 290/53; 60/398; 60/497; 60/498; 417/330; 417/331; 405/75; 405/76
(58) Field of Search ................................ 210/170, 121, 210/122; 60/398, 497, 498; 290/42, 53; 405/75, 76; 417/330, 331

(56) References Cited

U.S. PATENT DOCUMENTS

| 4,335,576 A | | 6/1982 | Hopfe |
| 5,167,786 A | | 12/1992 | Eberle |
| 5,186,822 A | * | 2/1993 | Tzong et al. ............... 210/122 |

* cited by examiner

Primary Examiner—W. L. Walker
Assistant Examiner—Krishnan S Menon
(74) Attorney, Agent, or Firm—Black Lowe & Graham PLLC (57) ABSTRACT

A tidal-powered desalinization system is mounted on a barge that oscillates about fixed pier structures, generating a two-way pumping action. The two-way pumping action is changed to a single direction flow of seawater. The sea water is directed into an on-board desalinization system. Fresh water is produced and collected in reservoirs, without an intervening generation of electricity.

15 Claims, 7 Drawing Sheets

BARGE-MOUNTED TIDAL-POWERED DESALINIZATION SYSTEM

PRIORITY CLAIM

This invention claims priority to U.S. provisional application Ser. No. 60/370,085, filed Apr. 4, 2002.

FIELD OF THE INVENTION

This invention relates generally to ocean powered desalinization systems.

BACKGROUND OF THE INVENTION

It has long been recognized that the oceans provide tremendous potential in kinetic energy which can be harvested to generate electricity. Across the globe there are many tidal electric generation systems installed and in full operation. An example of an installed and fully operational tidal electro-generation system is the barrage system installed near St. Malo on the Brittany Coast in France across the La Rance estuary. The St. Malo system is a 240 megawatt system and has been reliably generating electricity for a good number of years. Despite this good record the complete blockage of the La Rance estuary has caused significant environmental effects. The submerged turbine blades have interfered with migration of fish and the overall barrage itself has blocked shipping. Other tidal powered systems include tidal fences and submerged underwater windmills and all have a greater or lesser effect on the environment. The aforementioned power generating systems, though effective, are big and require a complex series of power grids to convey the power off the barrage or tidal fence to an offshore power collection and distribution system.

Smaller tidal and wave powered electro-generation systems include various wave riding devices which bob up and down and move dynamos that generate electricity. Although these systems are smaller and can be located at remote locations, they nevertheless require electricity to be harvested and a grid to be constructed onto these bobbing devices. The grid in particular is cumbersome and has limited their practical implementation.

Various locations across the globe in which tidal ranges are ideal for generating electricity are places that also happen to be devoid of water. Such locations are in Africa, the Mideast and Polynesia. As these desert coastal regions are commonly devoid of electricity and drinkable water, various devices have been proposed to meet both the electricity and potable water demands of coastal residents. Such a system is described in U.S. Pat. No. 5,167,786 which generates compressed oxygen and hydrogen gas on a toroidal float which moves up and down with the waves and the tide. This up and down motion drives a DC generator which in turn is arranged to electrolytically produce hydrogen and oxygen gas. The hydrogen and oxygen gas is stored on the toroidal float apparatus and transferred to a reaction chamber to chemically generate electricity. Electricity thus generated is then sent to a DC motor to drive a high pressure pump which forces sea water through a reverse osmosis membrane to remove salt and produce drinkable fresh water. This toroidal gas generation system to generate electricity to drive electric DC motors in order to make drinkable water is a desalinization system which works but it is unnecessarily complex. Where there is a need primarily for fresh water to be generated from a desalinization process especially in remote regions a gas generated gas reactor system is unduly complex and likely to not have the robustness to serve in remote locations. Furthermore, such a system is very costly.

In many desolate parts of the world that have a good tidal and wave coastline but yet is primarily in an arid region there is a need to have a robust mechanically simple desalinization system powered by the tides and wave action of the seas. Such a system is simplified if it does not have electric generators but instead goes directly to the desalinization process. Such a simplified system uses the potential and kinetic energy of the oceans to directly send saltwater into a desalinization system without the intervening production of electricity inherent in other systems.

The need for a simplified robust desalinization system powered directly by the oceans to make fresh water and store the fresh water is needed. Such a system must be fairly mobile, assembleable, disassembleable, and transportable to remote coastal locations where potable water is not easily obtained.

SUMMARY OF THE INVENTION

The instant invention overcomes many of the disadvantages of having a dual electricity generation system and a saltwater desalinization system. A preferred embodiment of the present invention utilizes a barge mounted to a plurality of pistons that reciprocate inside a matching plurality of vessels or cylinders, and utilizes the vertical motion being caused by the action of tidal forces and waves. Each piston is in fluid communication with the ocean as the source of power to perform on board desalinization. The barge is restricted to up and down vertical motions via a plurality of posts or piles secured by embedded positioning into the bedrock of the sea floor to stabilize the barge against ocean-caused lateral displacement. The up and down motion of waves and tidal forces causes the pistons to reciprocate upwards and downwards with its waves and tides. That is, as the tide rises or falls, the pistons rise and fall, generating a two-way pumping action. This pumping action is due to the combined forces of rising tides and falling tides, or the combined forces of rising waves and falling waves. There is no intervening electric generation of power from the use of alternate powered devices. This reciprocating pumping action delivers a pressurized saltwater flow. Using a plumbing and valving system, the pressurized saltwater flow is directed to an on board desalinization system, such as a reverse osmosis (RO) filtration system, that generates and stores fresh water into reservoirs by being powered directly from the reciprocating movement of waves and tides. The on board desalinization system is in fluid communication with each cylinder and reservoir.

Another preferred embodiment of the present invention does not utilize bedrock embedded piles or posts to keep the barge positioned at a chosen site on the ocean floor, but instead secures the barge's ocean floor location through supports massive enough to resist lateral displacement caused by wave and tidal action. This alternate preferred embodiment is particularly suited for ocean floors having deep sandy beds.

Yet another preferred embodiment of the present invention uses a single pile or post floating barge or platform that slidably oscillates between vertical limits imposed by wave and tidal action. The single pile is secured to the ocean floor by a support massive enough to resist lateral displacement of ocean flows. The pile or post projects through a platform aperture. Alternatively, the single pile may be embedded in the ocean floor to increase stability against lateral displacement.

BRIEF DESCRIPTION OF THE DRAWINGS

The preferred and alternative embodiments of the present invention are described in detail below with reference to the following drawings.

DETAILED DESCRIPTION OF THE INVENTION

Arrangement of the barge mounted tidal powered desalinization system comprises a series of pistons mounted to the barge which oscillate within cylinders attached to a shaft which is mounted into the bedrock of the ocean bed. To the shaft are attached a plurality of cylinders where each cylinder has a piston and the piston has a rod which is attached to the barge bottom. As the barge moves up or down with tidal or wave action the pistons move up or down within the cylinders. Through appropriate plumbing valves to direct the flow of saltwater in a one-way direction results in the delivery of saltwater into the reverse osmosis membranes.

The design of the instant invention using the rising and falling of the tides to create a flow of seawater under pressure suitable for feeding existing reverse osmosis desalinization systems. The design consists of a floating vessel attached to one end of a standard type hydraulic cylinder, the other end of the cylinder is connected to the sea floor. As the floating vessel or barge rises and falls with the tides, the cylinder is extended and compressed. This motion pumps the seawater. The pressure and flow rate of seawater depends on cylinder size and the mass of the vessel and the displacement of the vessel which occurs during tidal cycles.

On the upward stroke of the cycle the buoyant force of the float limits the amount of pressure that can be created. On the downward stroke the weight of the float determines the maximum pressure. The actual work on the down stroke is a function of gravity, not of the tides. The cylinders are sized so that the float is not really floating but is suspended on the cylinders.

In concert with the up and down motion of the barge in response to tidal flows and wave action, the cylinders are configured to cyclically deliver pressurized saltwater for subsequent desalinization. Simultaneously, the pressurized and delivered saltwater is replaced with incoming charges of salt water that will be subsequently pressurized and delivered for desalinization with the next tidal or wave action. For example, as the tide recedes the buoyant force on the barge decreases and the barge falls, pushing each piston downward into their respective cylinders. During each piston's downward stroke, each cylinder is configured to deliver pressurized saltwater for desalinization, and concurrently, to fill each cylinder with a replacement charge of saltwater. Similarly, as the tide comes in, the buoyant force on the barge increases and the rising barge pulls each piston upward into their respective cylinders. During the piston upward stroke, each cylinder is configured to deliver pressurized saltwater for desalinization, and concurrently, to fill each cylinder with a replacement charge of saltwater.

Thus, an unbalanced hydraulic cylinder is used as the pumping mechanism. The down stroke acts on the larger surface area of the cylinder. This is done so that the substantial mass of the floating vessel can be used to create pressure and flow. On the upstroke, buoyant forces lift the floating vessel, thereby acting on the smaller surface area portion of the hydraulic cylinder, generating a forward flow of saltwater. As the tide recedes, the floating vessel sinks, generating a down stroke. The down stroke generates a reverse flow of saltwater. The result is a system that is half powered by tidal forces and half powered by gravity. Pumping action can also be used to pump the fresh water exiting the reverse osmosis filters into the water distribution system resulting in the conversion of saltwater into potable water under pressure without any electrical or fuel input.

Figure 1:
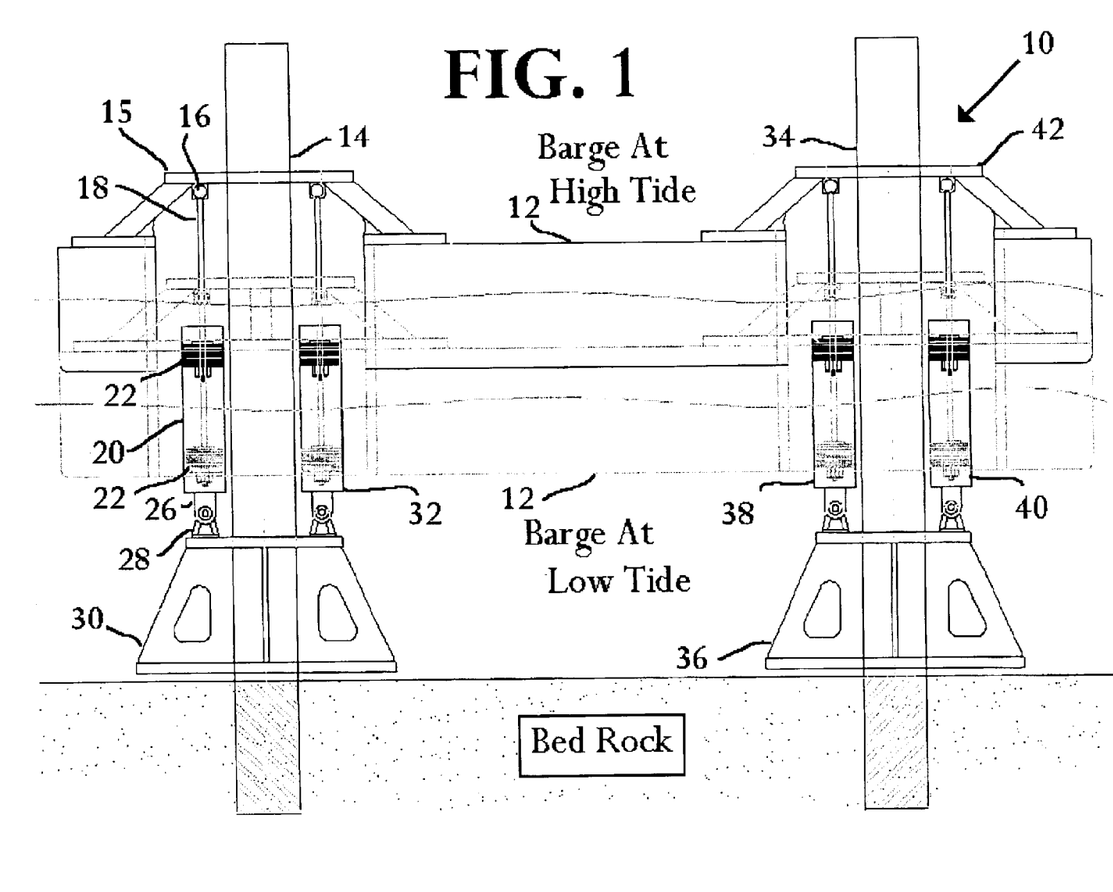
FIG. 1 is a preferred general arrangement of an approximately 50 foot by 100 foot barge which contains the desalinization system. The cylinders are depicted below the water line, and barge positions depicted include a high tide position and a low tide position.

The invention is best described by referring to the figures. In FIG. 1 the invention 10 is shown in two positions depending upon the tide position. A barge 12 is located in a high tide position and a low tide position. The Barge 12 moves up and down about along a first post 14 and along with a second post 34. Attached to the top side of the barge 12 is a first platform 15 which circumscribes the first post 14 and a second platform 42 which circumscribes the second post 34. The first post 14 and the second post 34 are mounted into the bedrock of the ocean floor. The first post 14 is supported by a first post guide 30 and the second post 34 is supported by a second post guide 36. The first and second guides 30 and 36 sit atop the bedrock of the ocean floor. On the first guide 30 is seen a first plurality of cylinders that includes a first cylinder 20 and a second cylinder 32. On second guide 36 is seen a second plurality of cylinders that includes a first cylinder 38 and a second cylinder 40. Within each cylinder is a piston seal and a piston rod assembly. Referring to the first cylinder 20 as representative for other cylinders, the other cylinders including, but not limited by, the second cylinder 32 of the first plurality of cylinders and the second cylinders 39 and 40 of the second plurality of cylinders, the piston rod assembly includes a piston seal 22 which is attached to a piston rod 18. The piston rod 18 is mounted to the first platform 15 by a rod end 16. Likewise, other piston rods are attached to the other seals within the other cylinders and are similarly attached to the first platform 15 and the second platform 42. As can be seen in FIG. 1 there are two extreme positions to the barge 12 when it floats at high tide and when the barge 12 floats at low tide. Similarly, the pistons will also occupy two extreme locations, the high tide position and the low tide position, and reciprocate within their respective cylinders. As depicted in FIG. 1, the piston seal 22 occupies the top position of the first cylinder 20 when the barge 12 is at high tide, then transits down the first cylinder 20 to the low tide position. As the tides and the waves oscillate in their own diurnal cycle, the piston seal 22 migrates between the high tide extreme and the low tide extreme. In so doing, saltwater is pumped by the movement of the barge as a consequence of rising with the tide and falling with gravity, generating a pressurized saltwater flow powered by a suction cycle and a discharge cycle. Using a plumbing and valving system (not shown), the suction and discharge cycles of the double acting cylinders are regulated to produce a steady pressurized flow of saltwater. The plumbing and valving systems include a first plumbing and valving system configured to deliver pressurized water to the on board desalinization system and a second plumbing and valving system configured to deliver incoming saltwater to the cylinders concomitantly as the pressurized saltwater is delivered from the cylinders.

Figure 2:
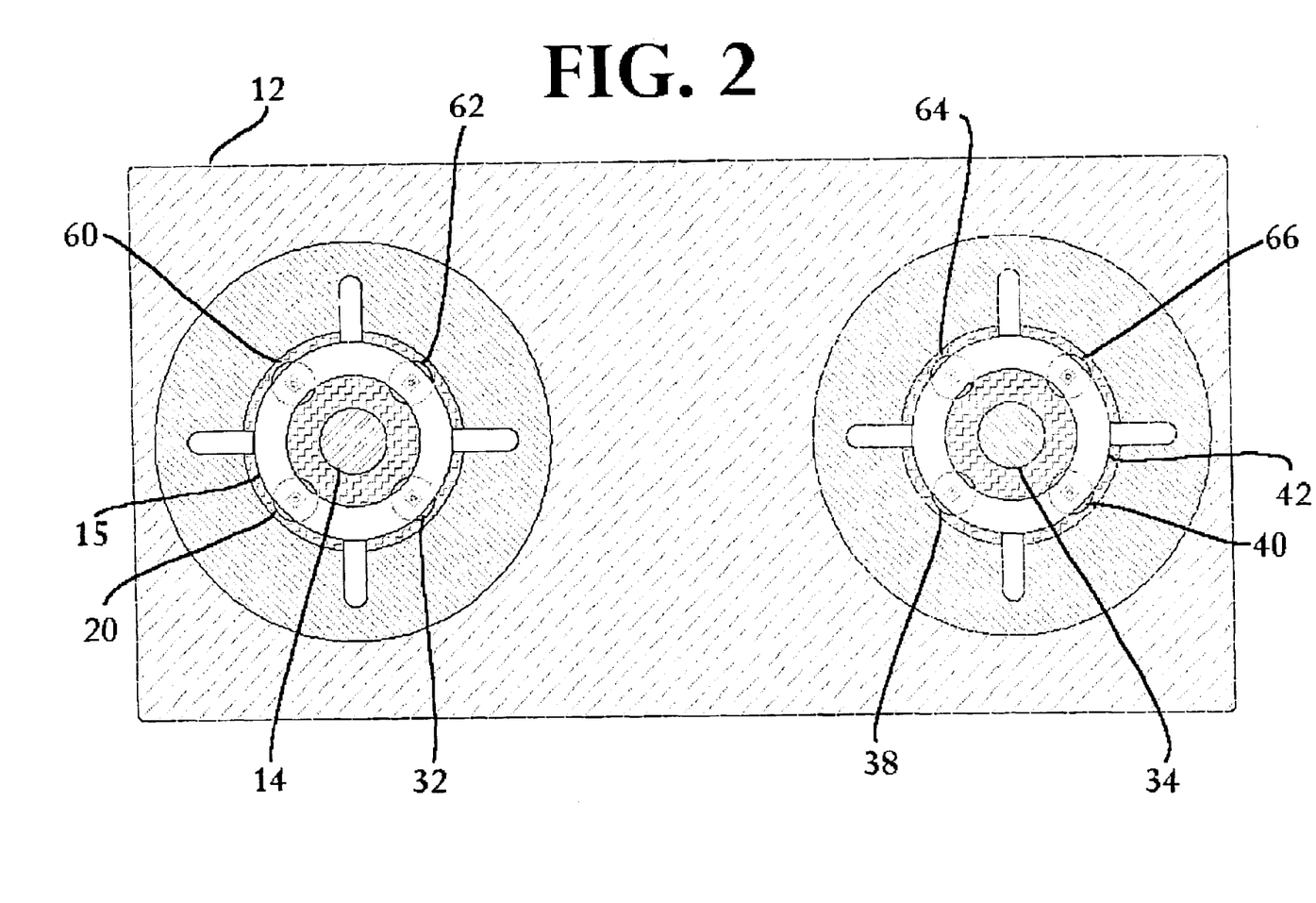
FIG. 2 is an up view or plan view of the preferred deck arrangement of the barge.

FIG. 2 shows in more detail the deck arrangement of the barge 12 in a top view. The top of the barge 12 is shown the first post 14 and the second post 34. The first post 14 is surrounded by the first platform 15 and the second post 34 is shown surrounded by the second platform 42. Beneath the first platform 15 is the first plurality of cylinders. The first plurality of cylinders includes the first cylinder 20, the second cylinder 32, a third cylinder 60, and a fourth cylinder 62. Beneath the second platform 42 resides the second plurality of cylinders. The second plurality of cylinder includes the first cylinder 38, the second cylinder 40, a third cylinder 64, and a fourth cylinder 66.

Figure 3:
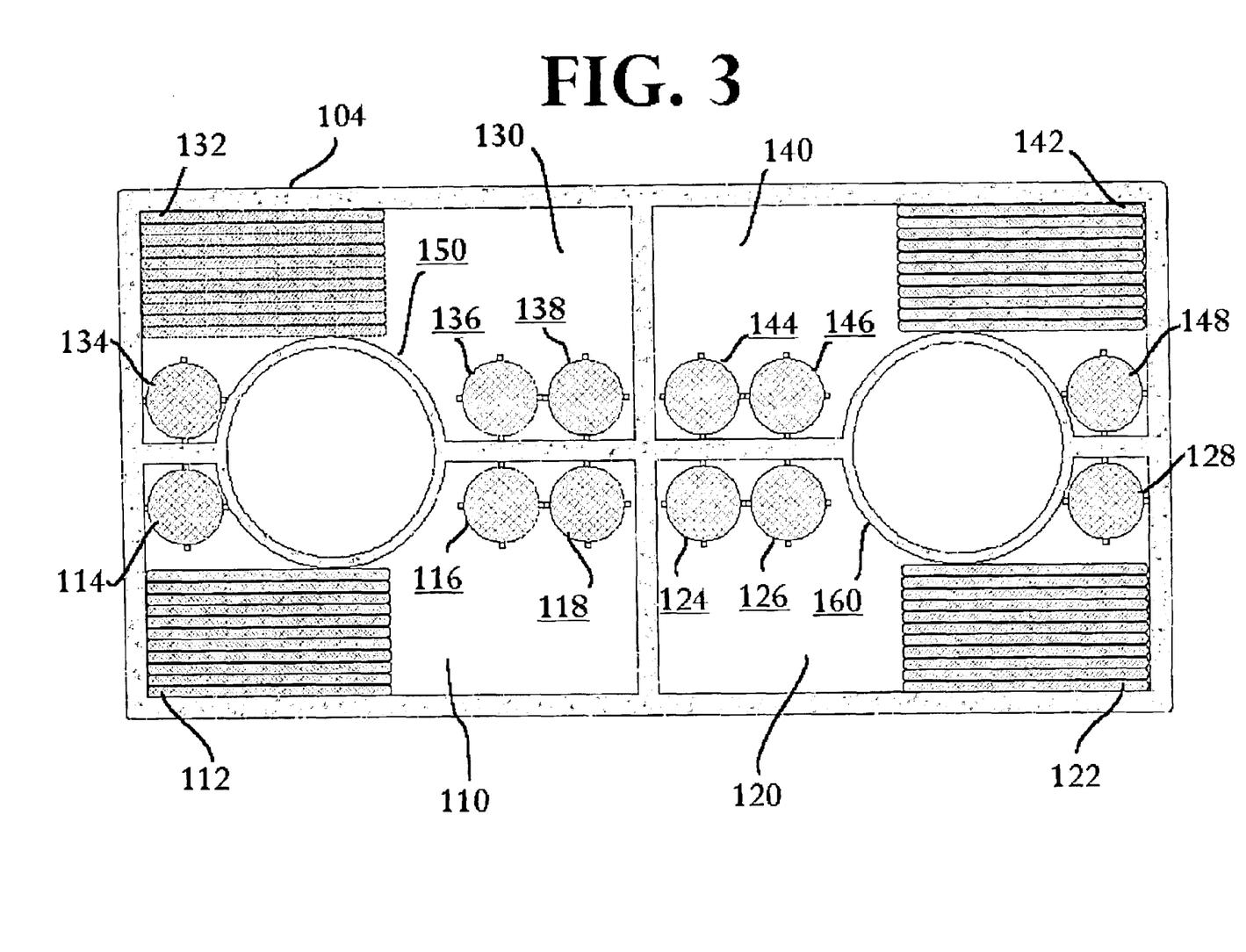
FIG. 3 is a cutaway view detailing a cutaway view of a preferred reverse osmosis filtration system and storage reservoir arrangement in the approximately 50 foot by 100 foot barge.

FIG. 3 shows a cutaway view of a preferred reverse osmosis filtration system and storage reservoir arrangement in the approximately 50 foot by 100 foot barge. The cutaway view is from the top view of the barge 12. The cutaway view 104 shows four compartments. The four compartments include a first compartment 110, a second compartment 120, a third compartment 130 and a fourth compartment 140. Each compartment contains a stack of reverse osmosis membranes and a plurality of water storage reservoirs. The first compartment 110 shows a first reverse osmosis stack 112 which is fed by a first plurality of pre-filtration tanks. The first plurality of pre-filtration tanks include a first tank 114, a second tank 116, and a third tank 118. The second compartment 120 has a second reverse osmosis stack 122 which is fed by a second plurality of pre-filtration tanks. The second plurality of pre-filtration tanks includes a first tank 124, a second tank 126, and a third tank 128. The third compartment 130 has a third reverse osmosis membrane stack 132 which is fed by a third plurality of pre-filtration tanks. The third plurality of pre-filtration tanks include a first tank 134, a second tank 136, and a third tank 138. The fourth compartment 140 contains a fourth reverse osmosis stack 142 which is fed by a fourth plurality of pre-filtration tanks. The fourth plurality of pre-filtration tanks includes a first tank 144, a second tank 146, and a third tank 148. Each reverse osmosis stack uses a third plumbing and valving system (not shown) to deliver the generated fresh water to the plurality of water storage reservoirs. Also seen in the cutaway view 104 is a first moon pool 150 delineating the space for the first post 14 and a second moon pool 160 delineating the space for the second post 34. Each reverse osmosis stack can be loaded with RO membranes configured to meet varying levels of salinity and silt contents in the saltwater.

Figure 4:
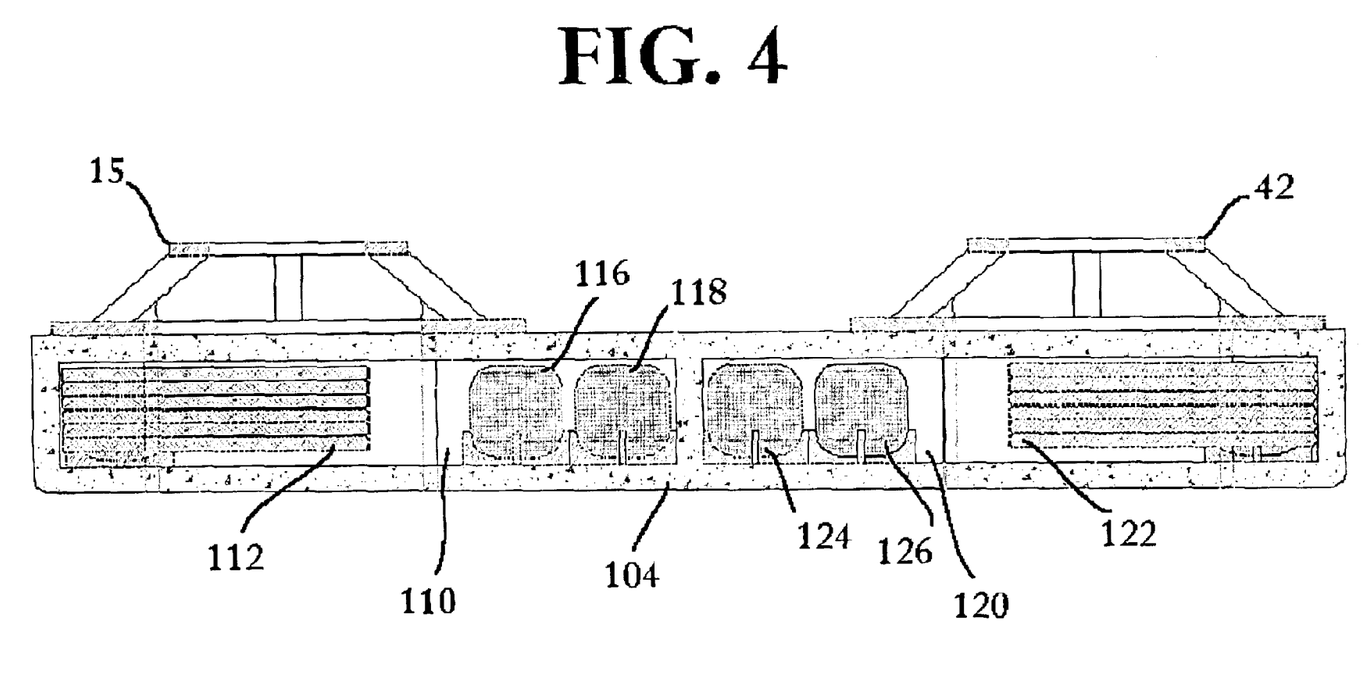
FIG. 4 is a depiction of the preferred machinery arrangement in a cutaway view of the approximately 50 by 100 foot barge.

FIG. 4 is a side cutaway view of the barge 12. The first and second platforms 15 and 42 are shown above the first compartment 110 and the second compartment 120 respectively. Within the first compartment 110 is seen the first reverse osmosis stack 112 and the second pre-filtration tanks 116 and 118 of the first plurality of pre-filtration tanks. Similarly, inside the second compartment 120 is seen the second reverse osmosis stack 122 and the first and second pre-filtration tanks 124 and 126 of the second plurality of prefiltration tanks.

Figure 5:
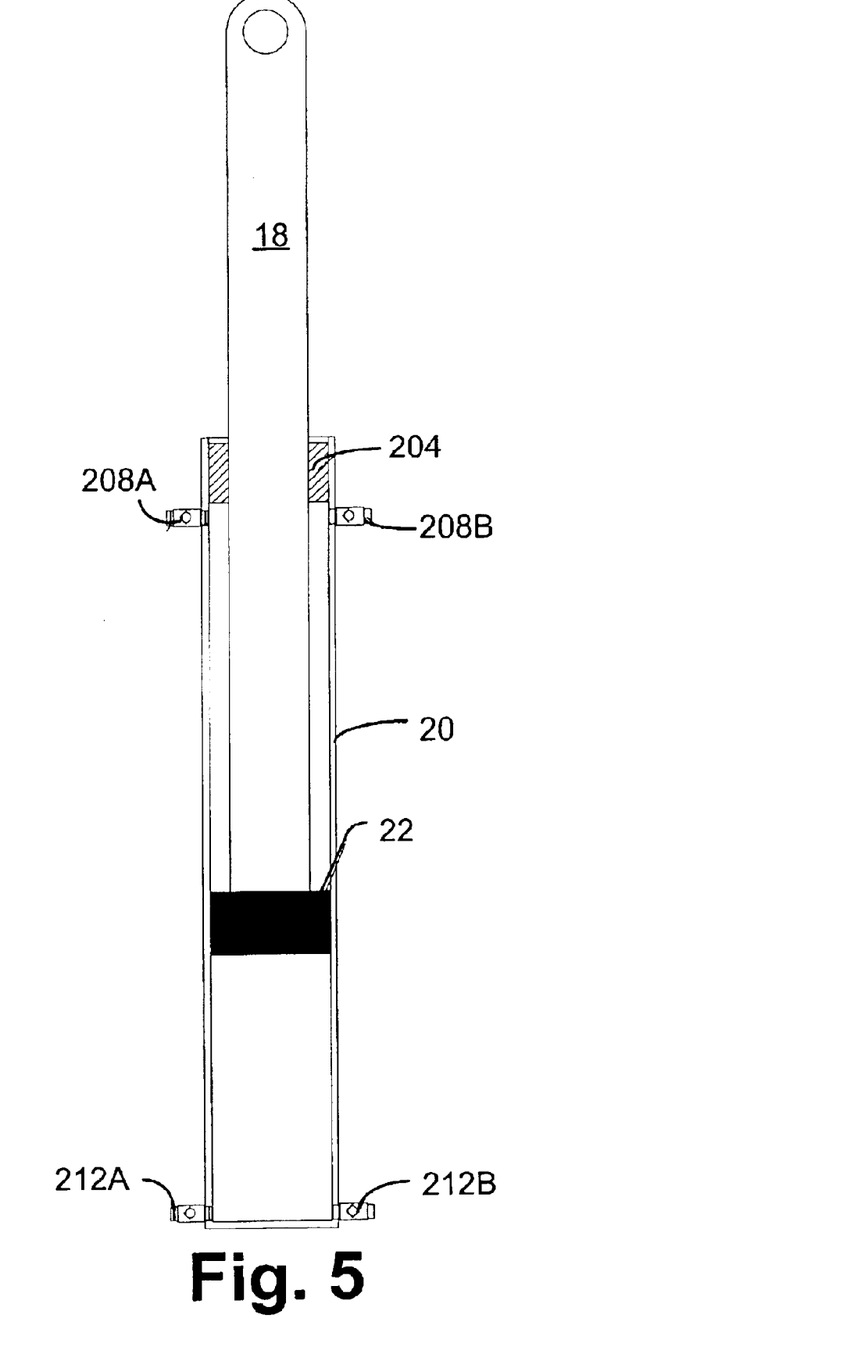
FIG. 5 is a depiction of a preferred arrangement of the cylinder and in-flowing and out-flowing check valves.

FIG. 5 is a depiction of a preferred arrangement of the cylinder and in-flowing and out-flowing check valves. FIG. 5 shows the arrangement for the cylinder 20 but is also representative for cylinders 32, 38, and 40 of FIG. 1. Inside the cylinder 20 is a connecting rod seal 204 that makes and maintains sealing contact with the connecting rod 18. As the connecting rod 18 reciprocates within the cylinder 20, the piston 22 creates a vacuum on the trailing side of the piston 22, and simultaneously creates pressure on the leading side of the piston 22. The vacuum created on the trailing side of piston 22 pumps in saltwater through incoming check valves 208A or 212A, depending if the piston 22 is moving downwards, or upwards, respectively. Similarly, the pressure created on the leading side of the piston 22 pressurizes the salt water and delivers to the outgoing check valves 208B and 212B, depending if the piston 22 is moving upwards or downwards, respectively.

Figure 6:
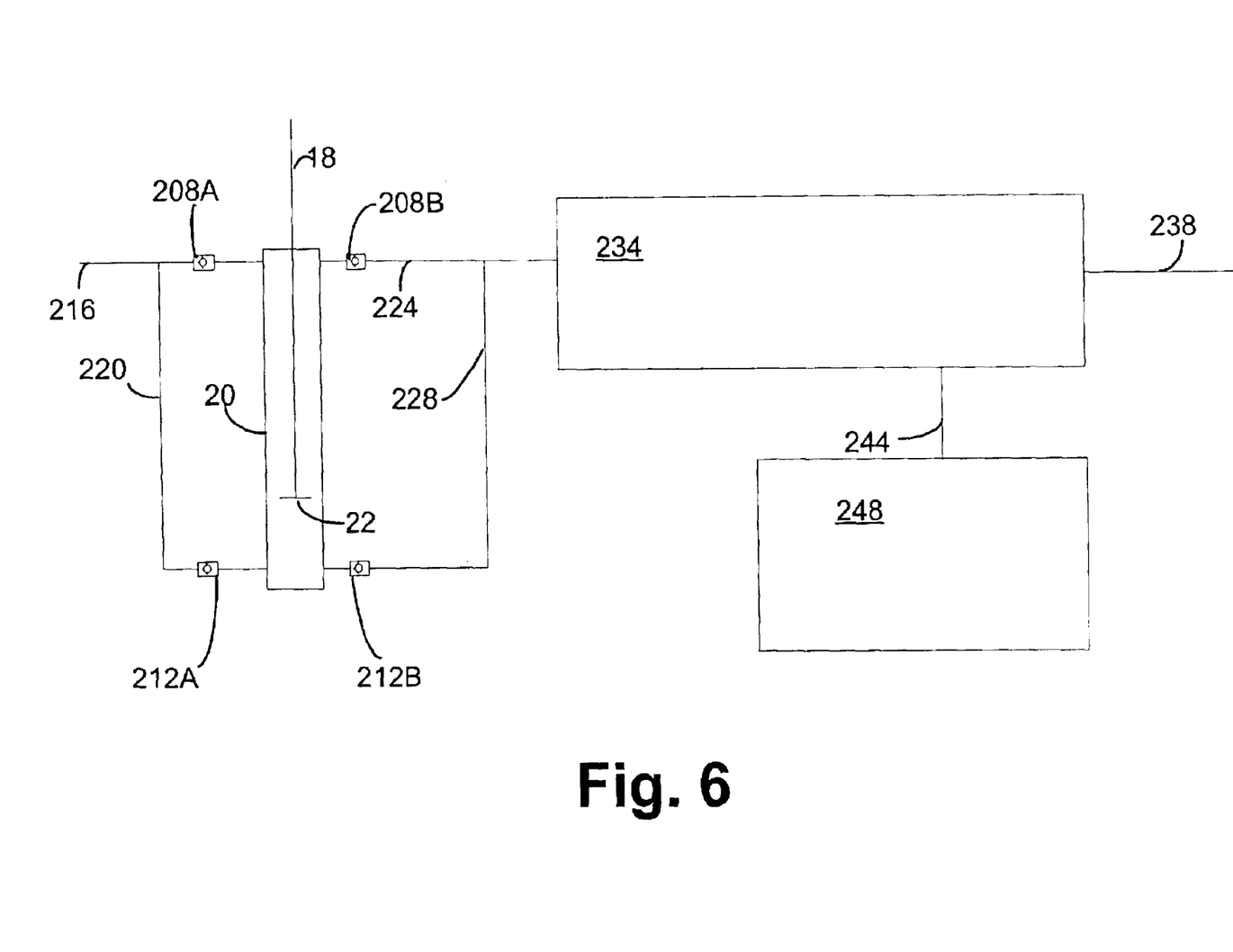
FIG. 6 is a schematic of the reverse osmosis purification system and its piping connection with cylinders and storage reservoirs.

FIG. 6 is a schematic of the reverse osmosis purification system its piping connection with cylinders and storage reservoirs. Again, using the cylinder 20 as representative for cylinders 32, 38, and 40 of FIG. 1, ambient pressure saltwater is drawn in through incoming check valve 208A through a first pipe 216. Alternatively, ambient pressure saltwater is drawn in through incoming check valve 212A trough a second pipe 220. Depending on the position of the connecting rod 18 and the piston 22, pressurized saltwater is delivered to the outgoing check valves 208B and 212B. Pressurized saltwater from outgoing check valve 208B is delivered by a third pipe 224 to a reverse osmosis filtration system 234. Similarly, pressurized saltwater from outgoing check valve 212B is delivered by a fourth pipe 228 to the reverse osmosis filtration system 234. The reverse osmosis filtration system 234 includes the reverse osmosis stacks 112, 122, 132, and 142 working in concert to produce purified water from saltwater. Saltwater excess not purified by the RO system 234 is discarded through a fifth pipe 238. Freshwater generated by the RO system 234 is delivered through a sixth pipe 244 to a plurality of storage reservoirs 248. The plurality of storage reservoirs 248 is representative of the reservoirs 114, 116, 118, 124, 126, 128, 134, 136, 138, 144, 146, and 148.

Figure 7:
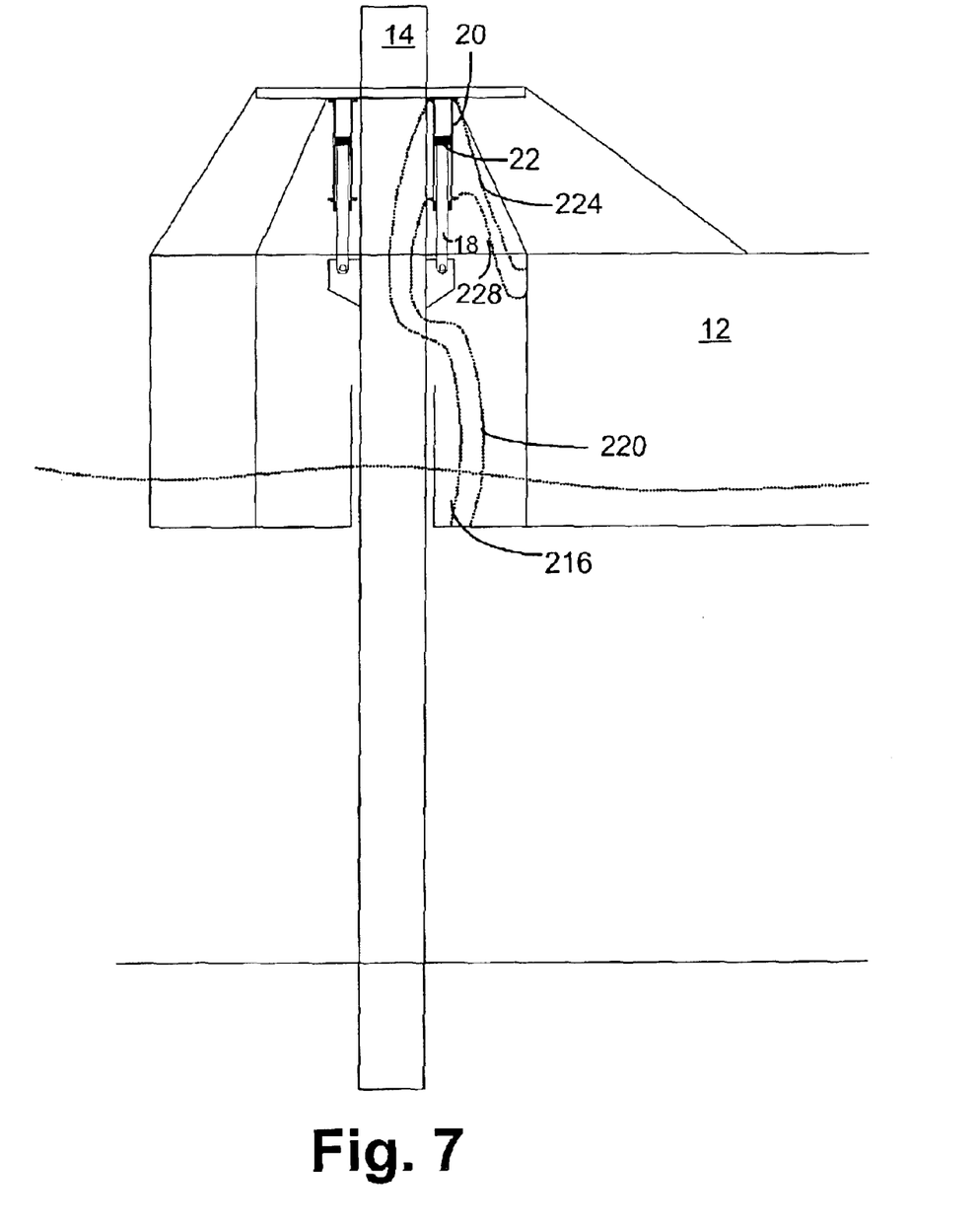
FIG. 7 is a schematic depiction of a preferred embodiment of the invention with the cylinders located above the water line.

FIG. 7 is a schematic depiction of a preferred embodiment of the invention with the cylinders not immersed in the saltwater, but instead located above the water line and located onboard the barge. A portion of the barge 12 illustrating the post 14 is shown in FIG. 7. The first pipe 216 and the second pipe 220 extend below the water line and each connects with the cylinder 20 that is now located onboard the barge 12, above the water line. Incoming saltwater is delivered via the first pipe 216 and the second pipe 220. Pressurized saltwater is delivered to the RO system 234 (not shown) from the cylinder 20 via the third pipe 224 and the fourth pipe 228.

While the preferred embodiment of the invention has been illustrated and described, as noted above, many changes can be made without departing from the spirit and scope of the invention. For example, more than two piles or posts can be used as vertical guides to the barge. More than four piston and cylinder assemblies may be mounted around each pile or post, and may be located in different sections of the barge. The vessels or cylinders may be constructed of metal, corrosion resistant metals, plastics, or plastic-lined metals of sufficient thickness and corrosion resistance to permit pumping action. For the preferred alternate embodiment not utilizing bedrock-embedded piles or posts to stabilize against ocean motion caused lateral displacement of the barge, the pile guides are configured to receive cement or receive heavy object attachments to impart enough weight and mass to resist and stabilize the barge against lateral displacement from ocean motion forces. All embodiments of the present invention may also be used to purify polluted fresh water sources. Piles or posts may be connected to the barge internally through barge apertures or secured along the periphery of the barge with collars. Cylinders may be placed around the piles or internally spaced above or below throughout the cross-sectional area of the barge platform. The invention may be adapted to existing floating structures, such as airport runways and parking lots. Accordingly, the scope of the invention is not limited by the disclosure of the preferred embodiment.

We claim:

1. A tidal and wave powered desalinization system comprising:
   a barge having:
     an aperture;
     a support located on the ocean floor, the support having a pile slidably connected through the aperture of the barge;
     a housing mounted to the support and connected to the barge, the housing in fluid communication with the ocean, the housing having:
       a piston engaged to reciprocate in the housing and connected to the barge; and
     a reverse osmosis filtration system in fluid communication with the housing,
     such that the up and down motion of tidal and wave action vertically displaces the barge to cause the piston to pump in saltwater and deliver pressurized saltwater to the reverse osmosis filtration system, wherein the reverse osmosis system generates fresh water.

2. The system of claim 1, wherein the housing is cylindrically shaped.

3. The system of claim 1, wherein the aperture is a plurality of apertures.

4. The system of claim 1, wherein the support is a plurality of supports.

5. The system of claim 1, wherein the pile is a plurality of piles.

6. The system of claim 1, wherein the tidal and wave produced pumping action causes the reverse osmosis filtration system to generates fresh water without the use of alternate powered devices.

7. A tidal and wave powered desalinization system comprising:
   a barge having:
     an aperture;
     a support located on the ocean floor, the support having a pile embedded into the ocean floor and slidably connected through the aperture of the barge;
     a housing mounted to the support and connected to the barge, the housing in fluid communication with the ocean, the housing having:
       a piston engaged to reciprocate in the housing and connected to the barge; and
     a reverse osmosis filtration system in fluid communication with the housing,
     such that the up and down motion of tidal and wave action vertically displaces the barge to cause the piston to pump saltwater and deliver pressurized saltwater to the reverse osmosis filtration system, wherein the reverse osmosis system generates fresh water.

8. The system of claim 7, wherein the housing is cylindrically shaped.

9. The system of claim 7, wherein the aperture is a plurality of apertures.

10. The system of claim 7, wherein the support is a plurality of supports.

11. The system of claim 7, wherein the pile is a plurality of piles, each pile embedded into the ocean floor.

12. The system of claim 7, wherein the tidal and wave produced pumping action causes the reverse osmosis filtration system to generates fresh water without the use of alternate powered devices.

13. A tidal and wave powered desalinization system comprising:
   a barge having:
     a plurality of apertures;
     a plurality of supports located on the ocean floor, each support having a pile embedded into the ocean floor to stabilize against lateral ocean movements and slidably connected through each aperture of the barge, whereby the barge is limited to up and down vertical motion along the supports;
     a plurality of housings, each housing mounted to each support and connected to the barge, each housing in fluid communication to the ocean, each housing having:
       a piston engaged to reciprocate in the housing and connected to the barge by a connecting rod; and
     a reverse osmosis filtration system in fluid communication with each housing,
     such that the up and down motion of tidal and wave action vertically displaces the barge to cause each piston to pump in saltwater into each housing and deliver pressurized saltwater to the reverse osmosis filtration system, wherein the reverse osmosis system generates fresh water.

14. The system of claim 13, wherein each housing is cylindrically shaped.

15. The system of claim 13, wherein the tidal and wave produced pumping action causes the reverse osmosis filtration system to generates fresh water without the use of alternate powered devices.

* * * * *